(12) United States Patent
Ehbets et al.

(10) Patent No.: US 6,606,156 B1
(45) Date of Patent: Aug. 12, 2003

(54) SPECTROMETER

(75) Inventors: Peter Ehbets, Zürich (CH); Adrian von Orelli, Zürich (CH); Eckard Vasold, Jena (DE); Wilhelm Schebesta, Jena (DE)

(73) Assignee: Gretag-Macbeth AG (CH)

( * ) Notice: Subject to any disclaimer, the term of this patent is extended or adjusted under 35 U.S.C. 154(b) by 0 days.

(21) Appl. No.: 09/538,236

(22) Filed: Mar. 30, 2000

(30) Foreign Application Priority Data

Apr. 1, 1999 (EP) ............................................. 99106111

(51) Int. Cl.$^7$ ................................................. G01J 3/18

(52) U.S. Cl. ....................................................... 356/328

(58) Field of Search ................................. 356/326, 328

(56) References Cited

U.S. PATENT DOCUMENTS 5,040,889 A     8/1991   Keane ........................... 356/51
5,319,437 A  *  6/1994   Van Aken et al. ........... 356/328

FOREIGN PATENT DOCUMENTS

EP        0 194 613        9/1986
EP        0 727 681        8/1996

* cited by examiner

Primary Examiner—F. L. Evans
(74) Attorney, Agent, or Firm—Cummings & Lockwood (57) ABSTRACT

A spectrometer is provided having a carrier, a light input for measurement light disposed on the carrier, a diffraction grating disposed on the carrier for dispersing the measurement light received from the light input, an opto-electronic detector disposed on the carrier for receiving and detecting the measurement light dispersed by the diffraction grating, at least one optical component for imaging the measurement light on the detector through the diffraction grating, a base board fastened to said carrier for supporting the opto-electronic detector, wherein the opto-electronic detector is fastened at a predetermined position on the base board, and wherein the base board and the carrier include positioning members for relatively positioning the base board on the carrier in a predetermined position. Preferably, the detector is a detector chip excluding a housing and fastened in a predetermined position on the base board. Both, carrier and base board have cooperating positioning members for positioning the base board on the carrier. The base board is preferably an electronic circuit board being fastened to the carrier in such a manner so as to allow a thermal expansion, and wherein the position of the fastening point P relative to the position of the detector on the base board is chosen such that the thermal expansion of the base board substantially compensates the drift of the spectral light component relative to the detector for at least an intermediate wavelength of the measured spectrum, the drift being caused by the thermal expansion of the diffraction grating and the carrier. In addition, the materials of the carrier, the base board, and the diffraction grating are selected with respect to their thermal expansion coefficients such that the temperature drift of the spectrum is substantially compensated for the entire measured spectrum. For most applications, the spectrometer is also sufficiently temperature compensated when using plastic components and is easily and economically produced.

18 Claims, 4 Drawing Sheets

SPECTROMETER

This application claims priority under 35 U.S.C. §§119 and/or 365 to 99 106 111.0 filed in Europe on Apr. 1, 1999, the entire content of which is hereby incorporated by reference.

FIELD OF THE INVENTION

The invention relates to a spectrometer.

BACKGROUND OF THE INVENTION

The trend in modern spectrometer systems is towards compact and economical detectors affording fast measuring times and a moderate spectral resolution of 5 to 20 nm. Typical applications for such sensors are in the areas of colour measuring techniques or industrial process control.

Spectrometers based on the known principle of diode arrays have the potential to fulfill the above mentioned requirements and form the basis for the present invention. The conditions for the applicability of the invention are discussed below.

The diode array affords a parallel assessment of the entire measured spectrum leading to fast measuring times.

The required spectral resolution is realized with a compact spectrometer geometry with a focal length of less than 30 mm. Several examples are demonstrated with classical spectrometer arrangements based on planar gratings, e.g. a demultiplexer of the Ebert-Fastie geometry as described in U.S. Pat. No. 4,744,618, or concave gratings with an aberration correction, e.g. EP-A 0 489 286.

An economical production requires the use of modern production and assembly techniques. The cost for such spectrometers is mainly determined by three factors: the cost of the components of the diode array and the diffraction grating as well as the cost for the fine tuning of the optical system.

Diode arrays are offered commercially by several manufacturers either in a ceramic or in a plastic housing, for example by Hamamatsu. This type of detector manufacture is used in existing diode array spectrometers, e.g. EP-A 0 489 286. Nevertheless, this detector geometry has several fundamental disadvantages.

First, a quality housing made from ceramic is very expensive and contributes largely to the total cost of a detector unit. Second, for the present application the position of the light sensitive detector area is not sufficiently specified relative to the outer dimension of a standard housing, particularly in a vertical direction. For this reason, the housing cannot serve as a mechanical reference during assembly. The diode array inside the housing, i.e. the actual detector chip or the diffraction grating, has to be actively positioned during assembly on the spectrometer (U.S. Pat. No. 5,040,889, EP-A 0 727 681, EP-A 0 489 286). This manufacturing procedure is costly and associated with high additional costs.

Classical gratings are replicated in an epoxy layer on an optical glass substrate. The procedure is demanding and is not suited for an economical production in large quantities. The costs for the grating can be dramatically reduced by using plastic gratings that are produced in an injection moulding process. This technology has recently become available. The injection moulding process allows for the direct fastening of very precise mechanical positioning aids on the grating component affording a simple assembly of the grating at the central spectrometer module without active adjustment.

The main problem with the use of plastic gratings is however their great temperature sensitivity. The lines of the grating expand proportionally with the thermal expansion coefficient of the plastic material which causes a shift of the measured spectrum with respect to the diode line and introduces an error in the calibration of the wavelength of the spectrometer. Since optical injection moulded plastic materials have thermal expansion coefficients in the order of magnitude of $8 \times 10^{-5}/°$ K, approximately 10 times larger than glass, this spectral shift becomes the main component in the temperature drift of the spectrometer. Thus, a compensation for the temperature drift is a prerequisite for the application of this technology.

Existing techniques for the compensation of temperature drifts of diode array spectrometers are disclosed in documents EP-A 0727 681 and U.S. Pat. No. 4,709,989. The techniques are based on the use of materials having a low thermal expansion coefficient and an exact adaptation of the thermal expansion coefficient of the various spectrometer components. U.S. Pat. No. 4,709,989 relates to the adaptation of the thermal expansion coefficient of the spectral module to the materials of the imaging optics through the use of a ceramic material. EP-A 727 681 discloses an adaptation of the expansion coefficient of the spectral module made of ceramics to the diode array made of silica. Both techniques attempt to yield an approximately even thermal expansion of the entire spectrometer such that the angles of the optical path inside the spectrometer remain the same and the thermal drift is minimized. However, both techniques are restricted in the choice of material for the spectral module and hence can not be used for economically producing spectral sensors from plastic materials.

Thus, there is a need to overcome this difficulty and to improve a spectrometer such that it is very easily and economically assembled, e.g. from components made of plastic materials, to yield, even with the use of plastic components, a small thermal drift sufficient for practical applications.

A spectrometer of the prior art is described in U.S. Pat. No. 5,040,889. In this prior art spectrometer, the detector is arranged on a base board which is moveable relative to the spectrometer housing (carrier) and adjustable by means of a micrometer screw. After successful adjustment, the base board is glued in place. The manufacture of this spectrometer is relatively construction intensive and labour intensive and hence requires great additional costs. Further, the temperature is continuously measured in these prior art spectrometers and an automatic re-calibration is carried out at predetermined temperature changes and at certain time intervals. Hence, only the temperature profile of the sensitivities of the single cells of the detector and their signal amplifiers can be compensated for but not the temperature dependent shift of the measured spectrum with respect to the diode array and thus the resulting error in the wavelength calibration of the spectrometer. The last mentioned problem is not discussed whatsoever in U.S. Pat. No. 5,040,889.

SUMMARY OF THE INVENTION

The solution of the object underlying this invention is discussed in the characterizing portion of the independent claim. Preferred embodiments in accordance with the present invention are the subject of the dependent claims.

The new spectrometer geometry in accordance with the spectrometer of the present invention does not require a housing for the detector, particularly the diode array, and is economically produced. Further, the particular spectrometer geometry allows a simple installation at the carrier.

Independently therefrom, mounting the detector on a base board in accordance with the present invention, especially in combination with an adaptation of the choice of material for the carrier, the diffraction grating, and the base board with respect to their expansion coefficients, allows for a complete compensation of the temperature drift in spectrometer systems having components made from plastic materials. The compensation in accordance with the present invention is based on an optimum geometric arrangement and connection of the carrier and the detector. This new technique provides a free choice of material and allows for the consideration of additional technical parameters of the production, such as the manufacturing costs.

In accordance with the invention, the base board is mounted to a carrier in such a way that a temperature dependent shift of a measured spectrum with respect to a detector is at least approximately compensated for, the temperature dependent shift being caused by a thermal expansion of the base board.

BRIEF DESCRIPTION OF THE DRAWINGS

Exemplary embodiments of the present invention are further described by way of the following drawings in which.

DETAILED DESCRIPTION OF THE INVENTION

A diode array spectrometer in accordance with the present invention is generally constructed from several base components: a carrier 1 with a possibility for mounting a light input 2, such as an optical fiber and/or mechanical entry gap, a detector in form of a diode array 3, optical components for imaging the incoming light onto the diode array 3, and a diffraction grating 4 for dispersing the measurement light that was provided through a light input into its spectral components.

Figure 1:
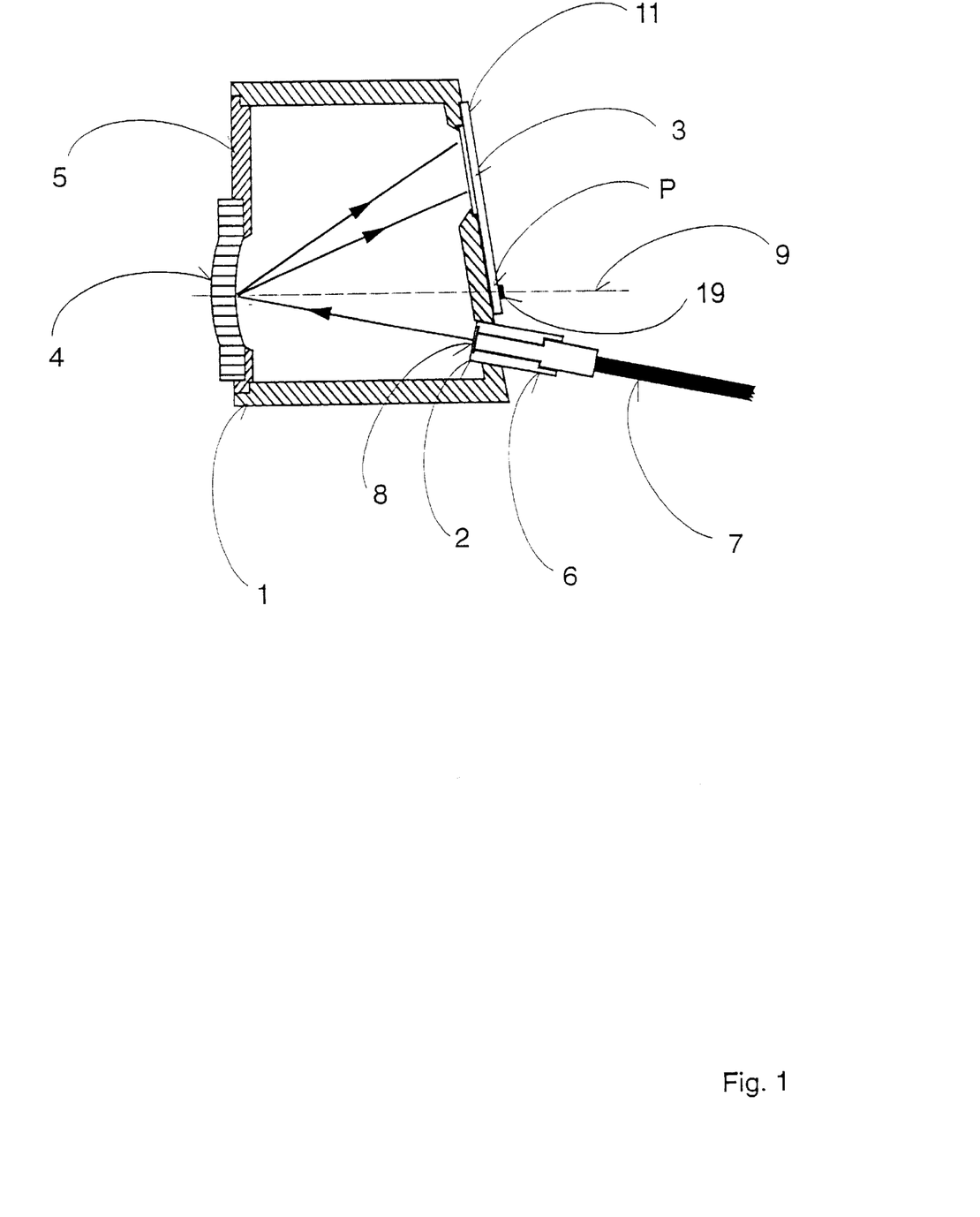
FIG. 1 shows a sectional view of a preferred embodiment of a spectrometer in accordance with the present invention.

FIG. 1 shows a preferred embodiment of the invention, with respect to geometry, based on a concave reflexion diffraction grating 4 having correction for imaging errors. In this arrangement, the concave reflexion diffraction grating 4 provides optical imaging of the incoming light and a spectral dispersion of the measurement light.

Up to this point, the described spectrometer is substantially in agreement with the state of the art as was described above in conjunction with the cited prior art references.

FIG. 1 depicts the carrier 1 as a hollow carrier produced with very precise outer dimensions. The carrier 1 has the form of a cylindrical hollow body for an optimum temperature response and is advantageously made from a plastic material using an injection moulding procedure. Mechanical positioning and mounting aids for additional components are installed at the carrier 1, analogously to EP-A0 194 613. The concave reflexion diffraction grating 4 is preferably made from a plastic material using an injection moulding procedure or by means of other replicating techniques. The optically active area of the concave diffraction grating 4 has a highly reflective layer within the spectral region of the measurement (for ex., for visible light aluminum is used with a protective layer of quartz ($SiO_2$)). Mechanical positioning aids are formed on the grating component made from a plastic material for allowing a precise mounting on the carrier 1 and an accurate orientation of the grating lines. The mounting of the grating onto the carrier 1 is carried out by means of a supporting board 5.

The light input is formed by a sliding tube 6 having an optical fibre 7 and a mechanical entry gap 8. Alternatively, the optical fibre 7 itself forms the mechanical entry gap. The sliding tube 6 is positioned in a guiding bore on the carrier, is oriented by means of a mechanical guide track, and is positioned across from a reference position on the carrier.

Starting with FIG. 1 the invention and particularly its differences from the prior art are further explained below. The method in accordance with the present invention for the support and mounting of a diode array as well as the compensation for a temperature drift is not only applicable to geometries according to FIG. 1 but is also directly applicable to other spectrometer geometries, such as the Czerny-Turner, Ebert-Fastie, or Littrow arrangements, which are also based upon even gratings.

Measurement light coming from the entrance 2 is imaged onto an exit area by the reflexion diffraction grating 4 where it is dispersed into its spectral components. The centre of the light input and the normal 9 through the centre point of the grating 4 define a plane, the so-called dispersion plane, in which the spectral dispersion of the measurement light takes place. The grating lines of the reflexion diffraction grating 4 are then oriented in the centre point of the grating perpendicular to the dispersion plane, in this example perpendicular to the plane of the drawing.

The diode array 3 needs exact positioning in the exit area across the spectrum of the measurement light. Typical demands upon the precision of the positioning of the diode array are +/−0.1 mm within the exit area and less than +/−0.050 mm in the depth of field perpendicular to the exit plane. This precision is not achieved with commercial diode arrays in standard housings.

Figure 2:
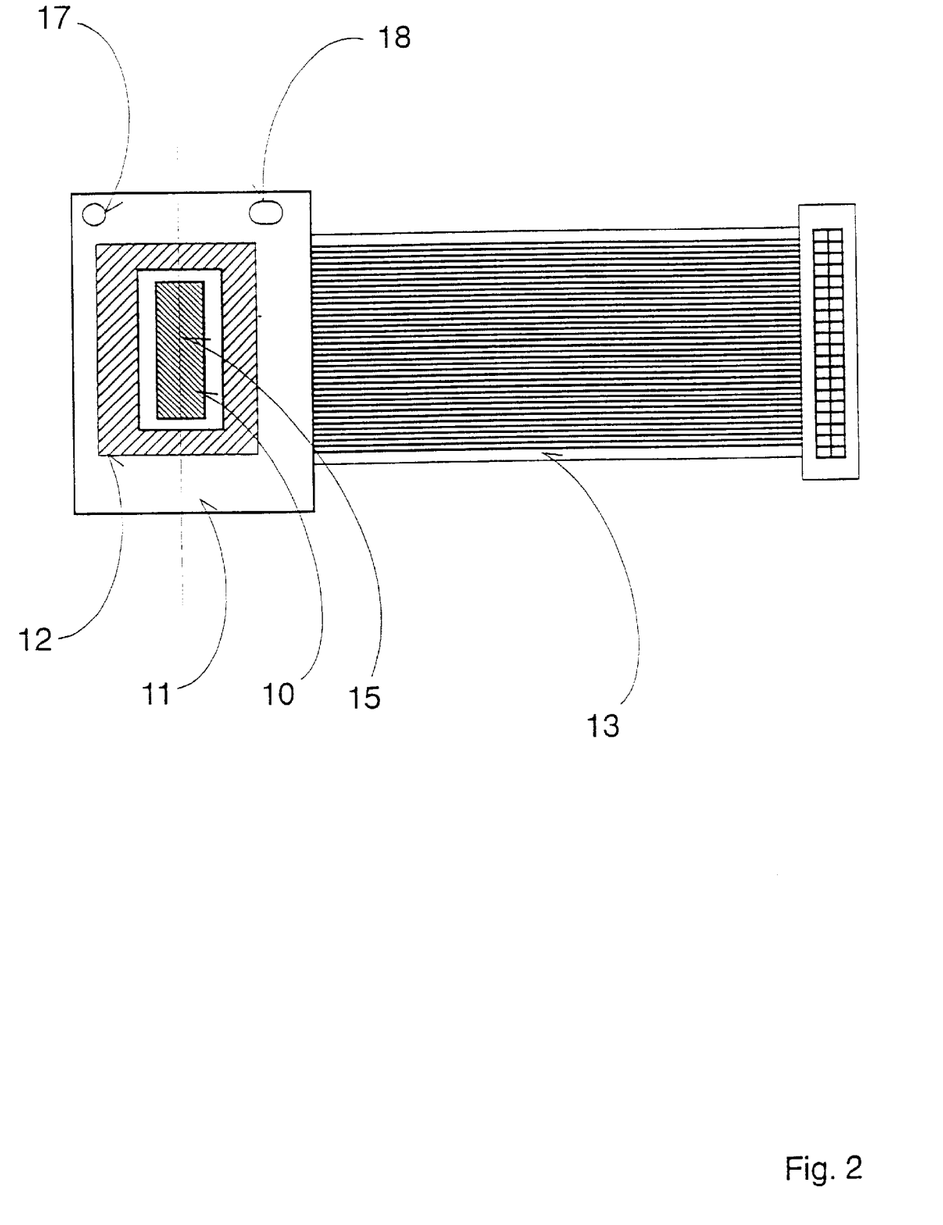
FIG. 2 shows a base board of the spectrometer presented in FIG. 1 provided with a diode array.

The present invention provides a new possibility for mounting diode arrays 3 or other detector types onto the carrier 1 of the spectrometer. The geometrical arrangement in accordance with an embodiment of the present invention is depicted in FIG. 2. In accordance with one embodiment of the present invention, a detector chip 10 (diode array field) made from a semi-conductor material is glued directly to a planar base board 11, without the typical housing. Preferably, the base board 11 is a conductor board ("Printed Circuit Board"(PCB)), which allows for a direct equipment with an additional electronic circuit. Alternatively, the base board is made from other materials, e.g. ceramics.

In addition, a protective frame 12 can be mounted on the base board 11 around the detector chip 10. This frame 12 is preferably higher than the detector chip 10 in order to protect electrical contact wires ("bonding wires") on the detector chip during manipulation and mounting of the detector chip.

The electrical wires can be guided from the base board 11 to a main wire board, not shown, via a flexible cable 13.

In accordance with an embodiment of the present invention the surface of the base board 11 can serve as a mechanical reference for the vertical positioning of the detector chip 10 relative to the surface of the base board 11, since the thickness of the detector chip 10, which is made from a semiconductor material (generally silica for visible light), is precisely defined through a manufacturing process of integrated electronic circuits (generally better than +/−0.01 mm).

In the text below the terms diode array and detector chip are used synonymously where there is no danger of mistaking one for the other.

Figure 3:
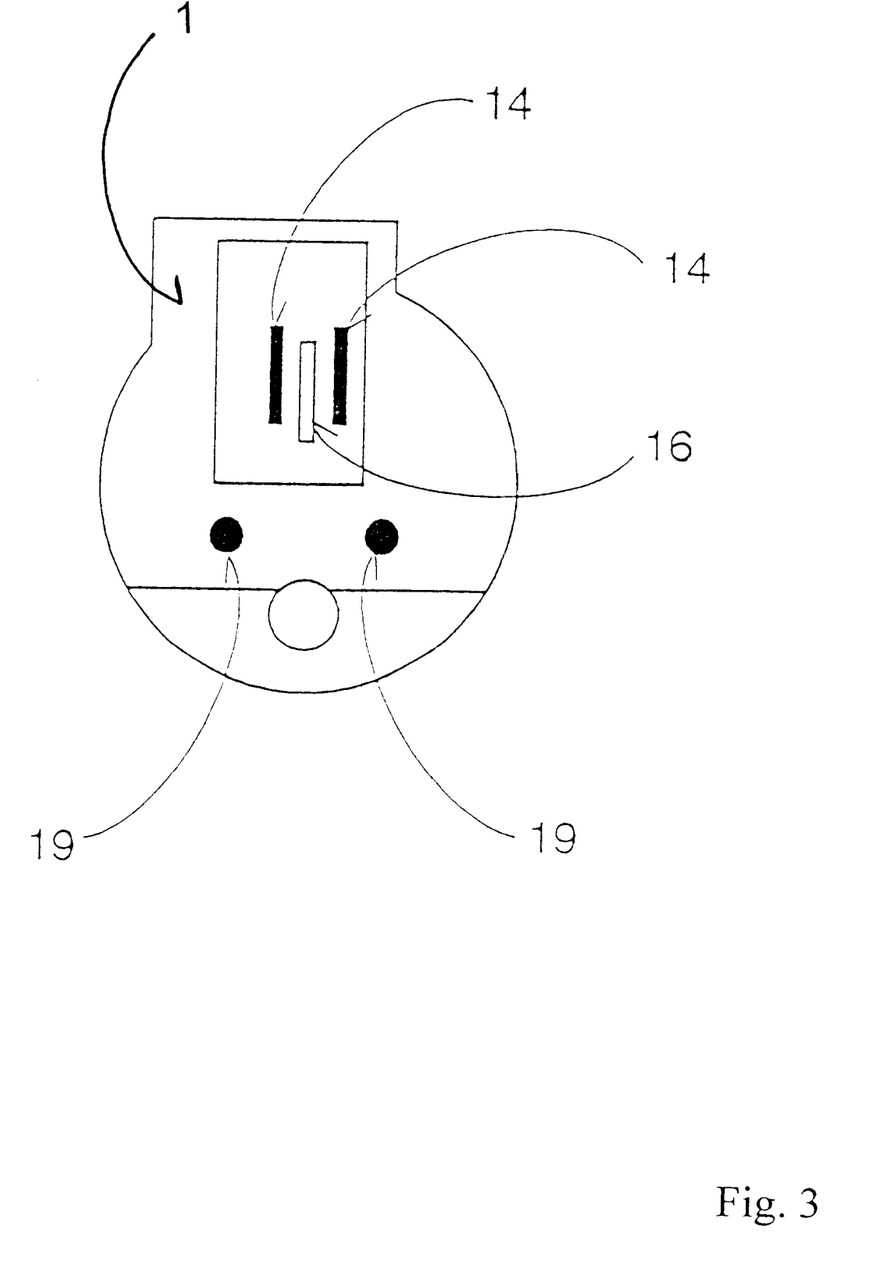
FIG. 3 shows a view of the carrier of the spectrometer with a lifted off and unmounted base board.

The structure of the carrier is depicted in detail in FIG. 3. Two rectangular ribs 14 are formed on the carrier 1 of the spectral module for the vertical positioning of the diode array 3 perpendicular to the base board 11. The rectangular ribs 14 are arranged below and above a longitudinal axis 15 of the diode array and form a component for maintaining a distance to the base board 11. Between the ribs 14 is a rectangular opening 16 that serves as an aperture for the measurement light.

When glued, the detector chip 10 is laterally positioned in the plane of the base board 11 across from the reference points on the base board. The positioning and glueing can be carried out automatically and economically with the required precision by means of a tipping machine as used in the production of semiconductors. Reference points can be determined in several ways, for example from across the outer edges of the base board. Preferably, the reference is made by means of mechanical positioning aids on the base board 11, which allow a simple mounting on the carrier of the spectral module.

The spatial distribution of the measured spectrum is fitted to the light sensitive area of the diode array in diode array spectrometers and thus consists of a rectangular area with a height in the order of magnitude of 1 mm and a length of several millimeters, which are chosen to be slightly smaller than the length of the diode array. Hence, an absolute shift of the measured spectrum in the direction of the longitudinal axis of the diode array is not critical as this shift can be taken into consideration when calibrating the wavelength. However, a tilt of the measured spectrum with respect to the diode array is particularly critical for the mounting. In this case, an overlap between the diode array and the measured spectrum is not guaranteed anymore for the entire spectrum, which causes a significant signal loss.

For this reason, the mechanical positioning aids in FIG. 2 are preferably in the form of a round hole 17 and an oblong hole 18 in the base board 11. The centre of the round hole 17 can serve as an absolute reference position. The oblong hole 18 needs to be arranged such that a tilt with respect to the longitudinal axis of the diode array is prevented. In order to achieve an optimum thermal stability in the assembled state with the carrier 1 of the spectrometer, both of the positioning holes 17 and 18 have to be arranged on the same side of the diode array 3 and close to the reference axis 9 of the carrier 1. Preferably, the glueing of the base board 11 and the carrier 1 is carried out at the positioning holes 17 and 18. The exact position of the positioning holes 17 and 18 on the base board 11 with respect to the detector chip 10 is used as a free parameter for the compensation of the temperature drift. The compensation method and the calculation of the optimum position of the positioning holes is described below.

Corresponding positioning structures are mounted to the carrier. In the preferred embodiment with the circular hole and the oblong hole in the base board 11, two mechanically close-fitting cylindrical rods 19 are used, as shown in FIG. 3, onto which base board is placed.

During the mounting, the base board 11 is placed on the positioning structures 19 on the carrier 1. The bearing surface on the carrier 1 defined through the ribs 14. A firm mechanical connection between the two parts is achieved by glueing at the positioning structures: round hole 17 oblong hole 18 and positioning rods 19. In addition to the firmly glued area the base board 11 can be pressed onto the bearing surface of the carrier 1 with a spring in order to increase the stability.

As a last step in the assembly, the detector unit, i.e. base board 11 with mounted diode array 3, and the carrier 1 are preferably insulated with black paint in order to isolate external scattered light.

It is necessary to distinguish between two basically different components for the compensation of the temperature drift: first, a change in the signal strength and second, a spectral shift of the measured signal with respect to the diode array. The first drift component, the change of the signal strength, is not critical for most applications. This drift is completely compensated by carrying out measurements on a reference channel or with a white reference sample.

However, a wavelength dependent shift of the measured signal on the diode array is an interfering factor. This shift corresponds to another wavelength calibration of the spectrometer and can not be compensated by a simple reference measurement.

Thus, the invention is mainly concerned with the compensation of the temperature drift to minimize the spectral drift in the dispersion plane. Consequently the spectrometer unit needs to be constructed such that light of a certain wavelength always hits the diode array at a same position independently of the temperature. If this condition is met, a constant signal intensity is usually achieved.

Contrary to the prior art, the compensation technique in accordance with the present invention is based on a geometrical optimization and not on a choice of materials having substantially similar thermal expansion coefficients. The position of the mechanical fastening of carrier and base board and the exactly defined position of the detector thereon serve as a free optimization parameter. This yields a greater degree of freedom than choosing the materials for the components of the spectrometer. An ideal fastening point is located in the plane of dispersion. Preferably for glueing, the positioning structures are arranged on the base board and the carrier such that they are all on a straight line with the ideal fastening point and perpendicular to the plane of dispersion.

The compensation technique in accordance with the present invention is described in more detail below in conjunction with the diode array support with the base board. However, if desired the invention is applied more generally and also applicable to other detector types, such as two-dimensional CMOS or CCD detector arrays, and other types of detector housings.

The compensation of the temperature drift is based on a simple mathematical model for the spectral temperature drift of the spectrometer in the plane of dispersion. The calculation is based on a mathematical calculation of the optical path of a single main beam from the centre of the entrance through the centre of the diffraction grating in the exit plane where the diode array is located. The position of the main beam on the diode array is calculated before and after warming up. The difference in position is calculated via the wavelength calibration as a spectral shift.

The calculation of the optical path is based on known equations for geometrical optics and diffraction optics and hence is applicable to general spectrometer geometries. The simulation considers a thermal expansion of the components of the spectrometer for the case of an isotropic warming, i.e. the distances are proportional to the temperature difference with the thermal expansion coefficient of the corresponding material. The centre of the grating is chosen as a reference point for the calculation of the thermal expansion. In this simulation, higher order effects are neglected, such as temperature gradients and imaging errors which arise as a result of a thermal deformation of optical components.

Figure 4:
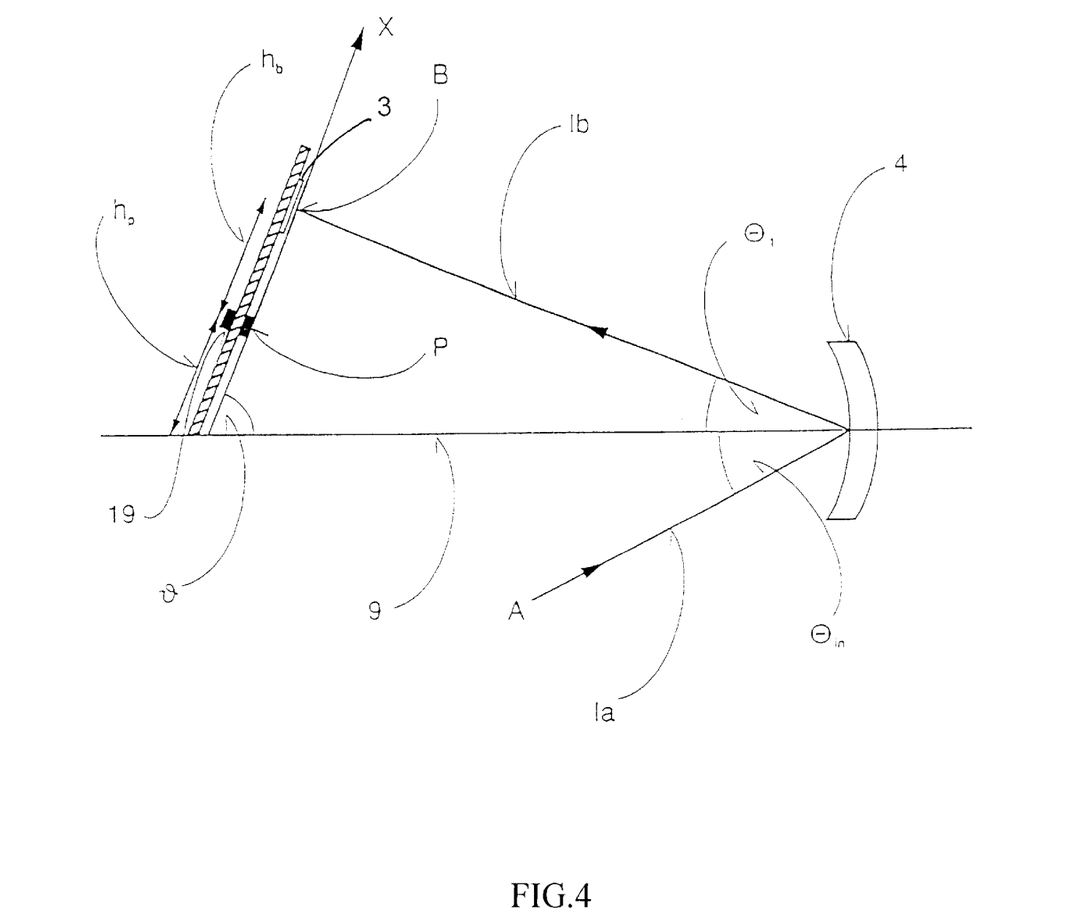
FIG. 4 shows a sketch explaining the determination of the temperature drift.

The geometry for the calculation is presented in FIG. 4.

The position of the entry gap on the carrier is denoted with the letter A. The distance to the centre of the grating M is denoted with 1$a$. The light beam is reflected at the diffraction grating and is deflected according to the equation for a grating with first order diffraction:

$$\sin \theta_1 = -\sin \theta_{in} + \lambda/\Lambda$$

wherein $\theta_1$ denotes the angle of the first order diffraction, $\theta_{in}$ in is the angle of incidence of the light beam on the grating, $\lambda$ is the wavelength of the light beam in the medium, $\Lambda$ denotes the period of the grating, and 9 is used to denote the normal to the grating.

The distance from the diffraction grating to the measurement point B in the exit plane (on the diode array) is denoted with 1$b$. The point of intersection between the exit plane and the plane of dispersion is denoted as the x-axis. The zero point of the x-axis lies on the normal of the grating 9 and a positive axis is chosen in the direction of the measurement point B. The base board 11 is fastened at point P on the carrier with respect to the x-axis. The distance between the normal of the grating 9 and point P is denoted with $h_p$. The distance on the base board 11 to point B on the diode array 3 or the detector chip 10 is denoted with $h_b$.

The thermal expansion occurs according to the following equation:

$$d_{\Delta T} = d_0(1 + \alpha \Delta T)$$

wherein $d_0$ and $d_\Delta T$ denote the distances before and after warming by a certain temperature difference $\Delta T$ and $\alpha$ is the thermal expansion coefficient of the respective material. The distances 1$a$, 1$b$, and $h_p$ are situated on the carrier 1 and expand with the thermal expansion coefficient $\alpha_t$ of the material of the carrier.

The grating constant $\Lambda$ expands with the thermal expansion coefficient $\alpha_g$ of the material of the grating and influences the angle $\theta_1$ of the first order diffraction as given by the equation for the grating. The distance $h_b$ is situated on the base board and expands with the thermal expansion coefficient $\alpha_d$ of the base board. The thermal expansion of the detector chip 10 situated on the base board and made from semiconductor material is negligible because of the small size and a small thermal expansion coefficient of the semiconductor material (f.ex., silica $\alpha = 2.5 \times 10^{-6}$ 1/° K).

For an analysis two drift components are calculated: First, the shift of the measurement point B along the x-axis $\Delta x_1$ as a result of the thermal expansion of the carrier 1 and the grating period $\Lambda$ and second, an absolute shift of the diode array 3 with respect to the x-axis $\Delta x_2$. A perfect compensation for the temperature drift is achieved when both components are identical over the entire wavelength region of the measured spectrum:

$$\Delta x_1 = \Delta x_2$$

The shift $\Delta x_1$ is calculated using the above cited equations. The shift of the diode array $\Delta x_2$ is determined by using the thermal expansion of the carrier 1 and the base board 11 (change of $h_b$ and $h_p$) and can be expressed with the following equation:

$$\Delta x_2 = h_p \alpha_t \Delta T + h_b \alpha_d \Delta T$$

Since the two components base board and carrier are made from different materials, it is possible to fit the temperature drift $\Delta x_1$ to that of $\Delta x_2$ by carefully choosing the position of the glueing point P, i.e. the relative distance of the detector chip 10 along the x-axis from the glueing point P on the base board 11. The spectral shift $\Delta x_2$ of the diode array is independent from the wavelength of the measurement light. Thus, by using this optimization of the position only a constant spectral drift is compensated over the entire wavelength region of the measured spectrum. The fastening via the positioning structures 17, 18, 19 on base board 11 and carrier 1 can be carried out on a straight line through the ideal point P perpendicular to the plane of dispersion.

The method for an optimum compensation of the temperature drift according to the described model can be carried out in two steps:

Choice of material for carrier 1 and grating 4 for a certain geometry of the spectrometer in order to achieve a nearly constant spectral shift $\Delta x_1$ over the entire wavelength region of the measured spectrum.

Remaining compensation of the spectral shift for an intermediate wavelength of the measured spectrum by finding an optimum position of the fastening point P of the carrier 1 and base board 11 of the detector unit 3. Of course, the resulting fastening point P has to meet geometrical requirements, i.e. it must be feasible on the carrier 1. Otherwise, the choice of material has to be changed accordingly.

The method of compensation is demonstrated using the following example.

Parameters of the spectrometer according to FIG. 4:

measured spectrum: 380 nm–730 nm period of grating: 2.1 $\mu$m

1$a$=22.3 mm

1$b$ (380 nm)=27.61 mm angle of incidence $\theta_{in}$: −7.034° angle of first order diffraction $\theta_1$ (380 nm): 17.521° tilt of the x-axis with respect to the normal of the grating $\gamma$: −2.946°

Preferred materials for the manufacture with thermal expansion coefficients.

grating: plastic material, $\alpha_g = 53 \times 10^{-6}$ 1/° K carrier: plastic material, $\alpha_t$=selectable to yield optimum temperature drift base board, diode array: PCB material, $\alpha_d = 16 \times 10^{-6}$ 1/° K The simulation of the thermal expansion yields an optimum thermal expansion coefficient for the carrier of $\alpha_t = 58 \times 10^{-6}$ 1/° K for a nearly constant spectral shift over the entire spectral region.

The compensation of the remaining temperature drift value for an intermediate wavelength of $\lambda = 550$ nm yields an optimum position for the fastening point of 0.5 mm above the normal of the grating.

The resulting spectral temperature drift is below 0.05 nm while being warmed up by 10° C.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A spectrometer comprising:
   a carrier;
   a light input for measurement light, said light input being disposed on the carrier;
   a diffraction grating disposed on the carrier for dispersing the measurement light received from the light input;
   an opto-electronic detector disposed on the carrier for receiving and detecting the measurement light dispersed by the diffraction grating;
   at least one optical component for imaging the measurement light via the diffraction grating onto the detector;
   abase board fixedly fastened in a non-movable manner to said carrier for supporting the opto-electronic detector, said opto-electronic detector being fixedly fastened in a non-movable manner at a predetermined position on the base board, said base board and said carrier including positioning members for relatively positioning the base board on the carrier in a predetermined position;
   wherein the base board is fastened to the carrier at a point P for allowing a thermal expansion of the base board, said point P being selected with respect to a position of the opto-electronic detector on the base board such that the thermal expansion of the base board substantially compensates at least a drift of a spectral light component relative to the opto-electronic detector at at least an intermediate wavelength of a measured spectrum, said drift being a result of a thermal expansion of the diffraction grating and the carrier.

2. A spectrometer as defined in claim 1, wherein the opto-electronic detector excludes a housing.

3. A spectrometer as defined in claim 2 wherein the opto-electronic detector is a diode array-chip detector without housing.

4. A spectrometer as defined in claim 2, wherein the opto-electronic detector is mounted on the base board.

5. A spectrometer as defined in claim 1, wherein the base board is an electronic circuit board.

6. A spectrometer as defined in claim 1, wherein the carrier material having a first linear thermal expansion coefficient, the based board material having a second linear thermal expansion coefficient, and the diffraction grating material having a third linear thermal expansion coefficient are each selected and adjusted relative to one another such that the drift of the spectral light component relative to the detector is substantially compensated for substantially the entire measured spectrum, said drift being caused by the thermal expansion of the diffraction grating and the carrier.

7. A spectrometer as defined in claim 2, wherein diffraction grating and the at least one optical component are combined into a concave reflexion diffraction grating.

8. A spectrometer comprising:
   a carrier;
   a light input for measurement light, said light input being disposed on the carrier;
   a diffraction grating disposed on the carrier for dispersing the measurement light received from the light input;
   an opto-electronic detector disposed on the carrier for receiving and detecting the measurement light dispersed by the diffraction grating;
   at least one optical component for imaging the measurement light via the diffraction grating onto the detector;
   a base board fixedly fastened in a non-movable manner to said carrier for supporting the opto-electronic detector, said opto-electronic detector being fixedly fastened in a non-movable manner at a predetermined position on the base board, said base board and said carrier including positioning members for relatively positioning the base board on the carrier in a predetermined position;
   wherein the base board is fastened to the carrier at least at one fastening point for allowing a thermal expansion of said base board, said at least one fastening point being positioned on a straight line perpendicular to a plane of dispersion, a position of said at least one fastening point being chosen relative to a position of the opto-electronic detector on the base board such that the thermal expansion of the base board substantially compensates at least a drift of a spectral light component relative to the opto-electronic detector at least at an intermediate wavelength of a measured spectrum, said drift being the result of a thermal expansion of the diffraction grating and the carrier.

9. A spectrometer comprising:
   a carrier;
   a light input for measurement light, said light input being disposed on the carrier;
   a diffraction grating disposed on the carrier for dispersing the measurement light received from the light input;
   an opto-electronic detector disposed on the carrier for receiving and detecting the measurement light dispersed by the diffraction grating;
   at least one optical component for imaging the measurement light via the diffraction grating onto the detector;
   a base board fixedly fastened in a non-movable manner to said carrier for supporting the opto-electronic detector, said opto-electronic detector being fixedly fastened in a non-movable manner at a predetermined position on the base board, said base board and said carrier including positioning members for relatively positioning the base board on the carrier in a predetermined position;
   wherein the diffraction grating is made from a plastic material.

10. A spectrometer comprising:
    a carrier;
    a light input for measurement light, said light input being disposed on the carrier;
    a diffraction grating disposed on the carrier for dispersing the measurement light received from the light input;
    an opto-electronic detector disposed on the carrier for receiving and detecting the measurement light dispersed by the diffraction grating;
    at least one optical component for imaging the measurement light via the diffraction grating onto the detector;
    a base board fixedly fastened in a non-movable manner to said carrier for supporting the opto-electronic detector, said opto-electronic detector being fixedly fastened in a non-movable manner at a predetermined position on the base board, said base board and said carrier including positioning members for relatively positioning the base board on the carrier in a predetermined position;
    wherein the carrier is made from a plastic material.

11. A spectrometer comprising:
    a carrier;
    a light input for measurement light, said light input being disposed on the carrier;
    a diffraction grating disposed on the carrier for dispersing the measurement light received from the light input;
    an opto-electronic detector disposed on the carrier for receiving and detecting the measurement light dispersed by the diffraction grating;

at least one optical component for imaging the measurement light via the diffraction grating onto the detector;

a base board fixedly fastened in a non-movable manner to said carrier for supporting the opto-electronic detector, said opto-electronic detector being fixedly fastened in a non-movable manner at a predetermined position on the base board, said base board and said carrier including positioning members for relatively positioning the base board on the carrier in a predetermined position;

wherein the opto-electronic detector excludes a housing; and wherein the carrier is of essentially cylindrical shape and the diffraction grating and the base board are arranged at two opposite end faces of the carrier.

12. A spectrometer comprising:

a carrier;

a light input for measurement light, said light input being disposed on the carrier;

a diffraction grating disposed on the carrier for dispersing the measurement light received from the light input;

an opto-electronic detector disposed on the carrier for receiving and detecting the measurement light dispersed by the diffraction grating;

at least one optical component for imaging the measurement light via the diffraction grating onto the detector;

a base board fixedly fastened in a non-movable manner to said carrier for supporting the opto-electronic detector, said opto-electronic detector being fixedly fastened in a non-movable manner at a predetermined position on the base board, said base board and said carrier including positioning members for relatively positioning the base board on the carrier in a predetermined position;

wherein the base board is disposed at the carrier such that a temperature dependent drift of the spectrum of the measurement light with respect to a location of the opto-electronic detector is at least partially compensated through a thermal expansion of the base board.

13. A spectrometer comprising:

a carrier;

a light input for measurement light, said light input being disposed on the carrier;

a diffraction grating disposed on the carrier for dispersing the measurement light received from the light input;

an opto-electronic detector disposed on the carrier for receiving and detecting the measurement light dispersed by the diffraction grating;

at least one optical component for imaging the measurement light via the diffraction grating onto the detector;

a base board fastened to said carrier for supporting the opto-electronic detector, said opto-electronic detector being fastened at a predetermined position on the base board, said base board and said carrier including positioning members for relatively positioning the base board on the carrier in a predetermined position;

wherein the base board is fastened to the carrier at a point P for allowing a thermal expansion of the base board, said point P being selected with respect to a position of the opto-electronic detector on the base board such that the thermal expansion of the base board substantially compensates at least a drift of a spectral light component relative to the opto-electronic detector at least an intermediate wavelength of a measured spectrum, said drift being a result of a thermal expansion of the diffraction grating and the carrier.

14. A spectrometer comprising:

a carrier;

a light input for measurement light, said light input being disposed on the carrier;

a diffraction grating disposed on the carrier for dispersing the measurement light received from the light input;

an opto-electronic detector disposed on the carrier for receiving and detecting the measurement light dispersed by the diffraction grating;

at least one optical component for imaging the measurement light via the diffraction grating onto the detector;

a base board fastened to said carrier for supporting the opto-electronic detector, said opto-electronic detector being fastened at a predetermined position on the base board, said base board and said carrier including positioning members for relatively positioning the base board on the carrier in a predetermined position;

wherein the base board is fastened to the carrier at least at one fastening point for allowing a thermal expansion of said base board, said at least one fastening point being positioned on a straight line perpendicular to a plane of dispersion, a position of said at least one fastening point being chosen relative to a position of the opto-electronic detector on the base board such that the thermal expansion of the base board substantially compensates at least a drift of a spectral light component relative to the opto-electronic detector at least at an intermediate wavelength of a measured spectrum, said drift being the result of a thermal expansion of the diffraction grating and the carrier.

15. A spectrometer comprising:

a carrier;

a light input for measurement light, said light input being disposed on the carrier;

a diffraction grating disposed on the carrier for dispersing the measurement light received from the light input;

an opto-electronic detector disposed on the carrier for receiving and detecting the measurement light dispersed by the diffraction grating;

at least one optical component for imaging the measurement light via the diffraction grating onto the detector;

a base board fastened to said carrier for supporting the opto-electronic detector, said opto-electronic detector being fastened at a predetermined position on the base board, said base board and said carrier including positioning members for relatively positioning the base board on the carrier in a predetermined position;

wherein the carrier material having a first linear thermal expansion coefficient, the base board material having a second linear thermal expansion coefficient, and the diffraction grating material having a third linear thermal expansion coefficient are each selected and adjusted relative to one another such that the drift of the spectral light component relative to the detector is substantially compensated for substantially the entire measured spectrum, said drift being caused by the thermal expansion of the diffraction grating and the carrier.

16. A spectrometer comprising:

a carrier;

a light input for measurement light, said light input being disposed on the carrier;

a diffraction grating disposed on the carrier for dispersing the measurement light received from the light input;

an opto-electronic detector disposed on the carrier for receiving and detecting the measurement light dispersed by the diffraction grating;

at least one optical component for imaging the measurement light via the diffraction grating onto the detector;

a base board fastened to said carrier for supporting the opto-electronic detector, said opto-electronic detector being fastened at a predetermined position on the base board, said base board and said carrier including positioning members for relatively positioning the base board on the carrier in a predetermined position;

wherein the diffraction grating is made from a plastic material.

17. A spectrometer comprising:

a carrier;

a light input for measurement light, said light input being disposed on the carrier;

a diffraction grating disposed on the carrier for dispersing the measurement light received from the light input;

an opto-electronic detector disposed on the carrier for receiving and detecting the measurement light dispersed by the diffraction grating;

at least one optical component for imaging the measurement light via the diffraction grating onto the detector;

a base board fastened to said carrier for supporting the opto-electronic detector, said opto-electronic detector being fastened at a predetermined position on the base board, said base board and said carrier including positioning members for relatively positioning the base board on the carrier in a predetermined position;

wherein the carrier is made from a plastic material.

18. A spectrometer comprising:

a carrier;

a light input for measurement light, said light input being disposed on the carrier;

a diffraction grating disposed on the carrier for dispersing the measurement light received from the light input;

an opto-electronic detector disposed on the carrier for receiving and detecting the measurement light dispersed by the diffraction grating;

at least one optical component for imaging the measurement light via the diffraction grating onto the detector;

a base board fastened to said carrier for supporting the opto-electronic detector, said opto-electronic detector being fastened at a predetermined position on the base board, said base board and said carrier including positioning members for relatively positioning the base board on the carrier in a predetermined position;

wherein the base board is disposed at the carrier such that a temperature dependent drift of the spectrum of the measurement light with respect to a location of the opto-electronic detector is at least partially compensated through a thermal expansion of the base board.

* * * * *